United States Patent
Muroi

(10) Patent No.: US 10,109,826 B2
(45) Date of Patent: Oct. 23, 2018

(54) SECONDARY BATTERY

(71) Applicant: TOPPAN PRINTING CO., LTD., Tokyo (JP)

(72) Inventor: Yuki Muroi, Tokyo (JP)

(73) Assignee: Toppan Printing Co., Ltd., Tokyo (JP)

(*) Notice: Subject to any disclaimer, the term of this patent is extended or adjusted under 35 U.S.C. 154(b) by 30 days.

(21) Appl. No.: 15/265,202

(22) Filed: Sep. 14, 2016

(65) Prior Publication Data

US 2017/0005302 A1  Jan. 5, 2017

Related U.S. Application Data

(63) Continuation of application No. PCT/JP2015/058222, filed on Mar. 19, 2015.

(30) Foreign Application Priority Data

Mar. 19, 2014 (JP) ................................ 2014-056758

(51) Int. Cl.
*H01M 2/02* (2006.01)
*H01M 2/06* (2006.01)
(Continued)

(52) U.S. Cl.
CPC ....... *H01M 2/0287* (2013.01); *H01M 2/0212* (2013.01); *H01M 2/06* (2013.01);
(Continued)

(58) Field of Classification Search
CPC ...... H01M 2/0287; H01M 10/04; H01M 2/06; H01M 2/0212; H01M 2/30; H01M 2/0285;
(Continued)

(56) References Cited

U.S. PATENT DOCUMENTS

2006/0127760 A1* 6/2006 Hatta .................... H01M 2/021
429/185
2012/0276443 A1 11/2012 Hatta et al.
(Continued)

FOREIGN PATENT DOCUMENTS

CN 1983669 A 6/2007
JP 2004-095543 A 3/2004
(Continued)

OTHER PUBLICATIONS

Machine translation of JP 2004-095543, retrieved from <https://worldwide.espacenet.com/?locale=en_EP> on Jan. 31, 2018.*
(Continued)

*Primary Examiner* — Cynthia K Walls
(74) *Attorney, Agent, or Firm* — Foley & Lardner LLP

(57) ABSTRACT

A secondary battery of the present invention includes a battery element that includes a positive electrode and a negative electrode, a plurality of metal terminals that are connected to the positive electrode and the negative electrode, the metal terminals each having an outer peripheral surface provided with a resin film, and includes a lamination of at least a metal foil layer and a heat-sealable resin layer made of a polyolefin resin. A first package sealed portion, a second package sealed portion and a film sealed portion are each formed by pressing and heat sealing so as to have a thickness smaller than that of the peripheral region. The film sealed portion has a specific heat of fusion measured according to JIS K 7122 greater than that of a portion of the resin film other than the film sealed portion.

8 Claims, 5 Drawing Sheets

(51) Int. Cl.
*H01M 2/30* (2006.01)
*H01M 10/04* (2006.01)

(52) U.S. Cl.
CPC ............ *H01M 2/30* (2013.01); *H01M 10/04* (2013.01); *H01M 2/0277* (2013.01); *H01M 2/0285* (2013.01); *H01M 2220/20* (2013.01); *H01M 2220/30* (2013.01)

(58) Field of Classification Search
CPC ........... H01M 2/0277; H01M 2220/30; H01M 2220/20
See application file for complete search history.

(56) References Cited

U.S. PATENT DOCUMENTS

| | | |
|---|---|---|
| 2014/0329122 A1 | 11/2014 | Hatta et al. |
| 2016/0020435 A1 | 1/2016 | Hatta et al. |
| 2016/0049620 A1 | 2/2016 | Hatta et al. |
| 2017/0069882 A1 | 3/2017 | Hatta et al. |
| 2018/0123092 A1 | 5/2018 | Hatta et al. |

FOREIGN PATENT DOCUMENTS

| | | |
|---|---|---|
| JP | 2008-103294 A | 5/2008 |
| JP | 2009-224218 A | 10/2009 |
| JP | 2010-080326 | 4/2010 |
| JP | 4900418 B2 | 3/2012 |
| JP | 2012-234670 A | 11/2012 |
| JP | 5308696 | 10/2013 |
| WO | WO-01/56093 A1 | 8/2001 |

OTHER PUBLICATIONS

International Search Report issued in International Patent Application No. PCT/JP2015/058222 dated Jun. 16, 2015.

Office Action issued in corresponding Korean Patent Application No. 10-2016-7025806 dated Sep. 11, 2017.

Chinese Office Action dated Mar. 30, 2018 in corresponding application No. 2015800147738.

* cited by examiner

SECONDARY BATTERY

CROSS-REFERENCE TO RELATED PATENT APPLICATIONS

This application is a continuation application filed under 35 U.S.C. § 111(a) claiming the benefit under 35 U.S.C. §§ 120 and 365(c) of International Application No. PCT/JP2015/058222 filed on Mar. 19, 2015, which is based upon and claims the benefit of priority of Japanese Patent Application No. 2014-056758, filed on Mar. 19, 2014, the entire contents of them all are hereby incorporated by reference.

TECHNICAL FIELD

The present invention relates to a secondary battery.

BACKGROUND

In recent years, secondary batteries have been increasingly developed as storage devices used for personal computers, mobile terminal devices, such as mobile phones, video cameras, satellites, vehicles, and the like, to make the devices ultrathin and compact. As packaging materials used for such batteries, laminated packaging materials formed of a multilayer film (e.g., with a configuration of base material layer/first adhesive layer/metal foil layer/second adhesive layer/heat-sealable resin layer) are attracting attention. Unlike metal cans that have conventionally been used as containers, the laminated packaging materials formed of a multilayer film are superior to the metal cans from the viewpoint that the laminated packaging materials have light weight and high heat dissipation properties, and allow for free selection of shape.

Power supply from a secondary battery provided with such a packaging material of a multilayer film involves use of metal terminal members, referred to as tabs, which are respectively connected to a positive electrode and a negative electrode. The tabs each include a metal terminal (lead) and a resin film (tab sealant) covering the metal terminal. For example, in a lithium ion secondary battery, aluminum is typically used for the positive-electrode lead, and copper for the negative-electrode lead. The tab sealant is interposed between each lead and the packaging material, and required to satisfy the following performances.

In the first place, a tab sealant can have adhesiveness to both a lead and a packaging material. Adhesion between a packaging material and a tab sealant can be ensured by the tab sealant being made of a heat-sealable resin. Adhesion between a lead and a tab sealant can be improved by acid-modifying a polyolefin resin used for the tab sealant. Furthermore, when a tab sealant is sealed to a lead, a lead end portion can be filled with a tab sealant without forming a gap. When the filling is insufficient, a gap is formed between the tab sealant and the lead, causing leakage of contents or peeling.

In the second place, a tab sealant can ensure insulation between a lead and a packaging material. When a tab sealant and a lead are heat sealed, there is a concern that the thickness of the tab sealant is reduced, depending on the pressure or temperature conditions, and insulation is not ensured.

In particular, an end portion of a lead is most likely to be reduced in thickness. Measures required to be taken against the thickness reduction include reducing a melt flow rate to make the resin less fluid, or using a resin having a high melting point to make the resin less meltable, in a portion of the tab sealant.

Components included in a secondary battery contain substances that react with water infiltrating into the battery and can cause deterioration of the battery performance or corrosion of the members configuring the secondary battery. When a lithium ion secondary battery is taken as an example, it includes a lithium salt, such as lithium hexafluorophosphate or lithium tetrafluoroborate, as an electrolyte. When such a lithium salt reacts with water, hydrofluoric acid is generated, possibly causing corrosion and deterioration of the battery. Therefore, the laminated packaging material is configured to include a metal foil layer to prevent infiltration of moisture into the secondary battery through the surface of the packaging material.

For tabs, some methods are also reported as preventing infiltration of moisture through a tab sealant. For example, a tab sealant of PTL 1 has a configuration in which polyolefin layers are provided to both surfaces of a polyethylene naphthalate film. With this configuration of using a polyethylene naphthalate film having higher moisture barrier properties than polyethylene terephthalate, moisture infiltration is better prevented while trying to improve electrical insulation.

CITATION LIST

Patent Literature

[PTL 1] JP-B-4900418

SUMMARY OF INVENTION

Technical Problem

In PTL 1, moisture barrier properties are imparted through use of polyethylene naphthalate. However, the polyolefin layer is not prescribed as having moisture barrier properties. Therefore, there is a concern that moisture may pass through the polyolefin layer and infiltrates into the battery, and sufficient moisture barrier properties are not achieved by the tab sealant as a whole.

Therefore, in light of problems stated above, an object of the present invention is to provide a secondary battery which includes a resin film having moisture barrier properties exhibited throughout the resin film, insulating properties exhibited between a metal terminal and a packaging material, filling properties exhibited in a metal terminal end portion, and adhesiveness exhibited to the packaging material.

Solution to Problem

To solve the problems stated above, the present invention proposes the following means.

A secondary battery according to a first aspect of the present invention includes: a battery element that includes a positive electrode and a negative electrode; a plurality of metal terminals that are respectively connected to the positive electrode and the negative electrode, the metal terminals each having an outer peripheral surface provided with a resin film; a first packaging material and a second packaging material each of which includes a lamination of at least a metal foil layer and a heat-sealable resin layer made of a polyolefin resin, the first packaging material and the second packaging material sandwiching the battery element therebetween so that the heat-sealable resin layer is located inside; a first package sealed portion that is formed in the first packaging material so as to be smaller in thickness than in a first peripheral region of the first packaging material, by sandwiching the resin film between a first edge portion of the first packaging material and a second edge portion of the second packaging material, and pressing and heat sealing the first packaging material and the second packaging material sandwiching the resin film therebetween, in a manner of clamping the first and second packaging materials from outside; a second package sealed portion that is formed in the second packaging material so as to be smaller in thickness than in a second peripheral region of the second packaging material, by sandwiching the resin film between the first edge portion of the first packaging material and the second edge portion of the second packaging material, and pressing and heat sealing the first packaging material and the second packaging material sandwiching the resin film therebetween, in a manner of clamping the first and second packaging materials from outside; and a film sealed portion that is formed in the resin film so as to be smaller in thickness than in a third peripheral region of the resin film, by sandwiching the resin film between the first edge portion of the first packaging material and the second edge portion of the second packaging material, and pressing and heat sealing the first packaging material and the second packaging material sandwiching the resin film therebetween, in a manner of clamping the first and second packaging materials from outside, the film sealed portion being in intimate contact with the first packaging material and being in intimate contact with the second packaging material. In the secondary battery, positions at which the first package sealed portion, the second package sealed portion, and the film sealed portion are formed in a perpendicular direction to an end face of the first edge portion are within a range where the resin film is arranged in the perpendicular direction to the end face of the first end portion, and a specific heat of fusion of the film sealed portion measured according to JIS K 7122 is greater than a specific heat of fusion of a portion of the resin film other than the film sealed portion.

According to the first aspect, the resin film may be configured by laminating a plurality of layered bodies; at least one of the plurality of layered bodies may have the film sealed portion where a specific heat of fusion measured according to JIS K 7122, is 65 mJ/mg or more; of the plurality of layered bodies, an innermost layer and an outermost layer may have a specific heat of fusion, in the film sealed portion, in a range of 30 mJ/mg to 100 mJ/mg, inclusive, when a layer nearest to the metal terminal is the innermost layer and a layer farthest from the metal terminal is the outermost layer.

According to the first aspect, the film sealed portion may have a length in a range of 3 mm to 20 mm, inclusive, in the perpendicular direction.

According to the first aspect, in at least one of the plurality of layered bodies, a specific heat of fusion of a portion other than the film sealed portion measured according to JIS K 7122 may be 55 mJ/mg or more; and in the innermost layer and the outermost layer, a specific heat of fusion of a portion other than the film sealed portion measured according to JIS K 7122 may be in a range of 25 mJ/mg to 90 mJ/mg, inclusive.

According to the first aspect, in the film sealed portion of the plurality of layered bodies, a sum-total thickness of the layered bodies having a specific heat of fusion of 40 mJ/mg or more measured according to JIS K 7122 may be in a range of 20% to 80%, inclusive, relative to an overall thickness of the resin film.

According to the first aspect, in the resin film, the film sealed portion may have a thickness in a range of 50% to 90%, inclusive, relative to a thickness of a portion other than the film fused area.

According to the first aspect, the metal terminal may have a cross section in a rectangular shape, the cross section being taken parallel to a reference plane that is perpendicular to the perpendicular direction; the rectangular shape may have a first side that is arranged parallel to a sandwiching direction in which the first edge portion of the first packaging material and the second edge portion of the second packaging material sandwich the resin film therebetween; and in the cross section taken parallel to the reference plane, when a length of the resin film in a perpendicular direction that is perpendicular to the first side is L, a length of the first side is $L_1$, and a length of a second side orthogonal to the first side is $L_2$, Expression (1) may be satisfied:

$$L_1+2L_2 \le L \le 2L_1+2L_2 \qquad (1)$$

According to the first aspect, the innermost layer may contain a polyolefin resin that has been acid-modified; and the layered bodies in the plurality of layered bodies other than the innermost layer do not necessarily have to contain a polyolefin resin that has been acid-modified.

According to the first aspect, the first packaging material and the second packaging material may be each formed into the same shape that is a polygon and overlap each other, when viewed from the sandwiching direction; and the first packaging material may have a plurality of edge portions in which third edge portions other than the first edge portion are bent.

Effects of the Invention

According to the aspect of the present invention described above, there is provided a secondary battery which includes a resin film having moisture barrier properties exhibited throughout the resin film, insulating properties exhibited between a metal terminal and a packaging material, filling properties exhibited in a metal terminal end portion, and adhesiveness exhibited to the packaging material.

DESCRIPTION OF REPRESENTATIVE EMBODIMENTS

A secondary battery according to an embodiment of the present invention will hereinafter be described. However, it will be noted that any embodiments and aspects of the invention described below are merely representative of the invention, and the invention should not be limited to any specific embodiment or aspect described below.

Figure 1:
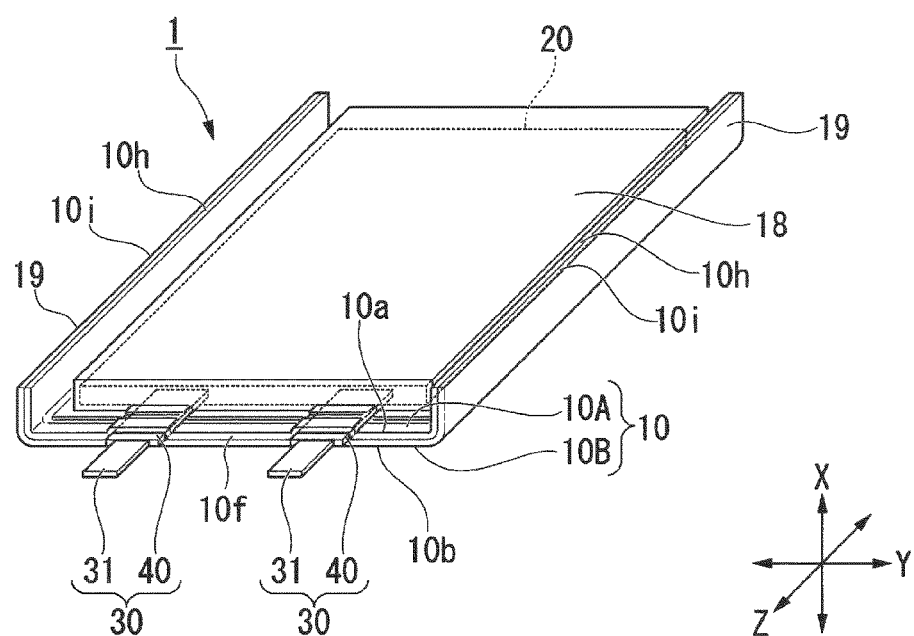
FIG. 1 is a perspective view illustrating a secondary battery, according to an embodiment of the present invention.

As shown in FIG. 1, a secondary battery 1 of the present embodiment includes a packaging material 10, a battery element 20 housed inside the packaging material 10, and a pair of tabs 30 connected to a positive electrode and a negative electrode, not shown, of the battery element 20 and sandwiched by surfaces of the packaging material 10. Edge portions of the packaging material 10 are bent.

Figure 2:
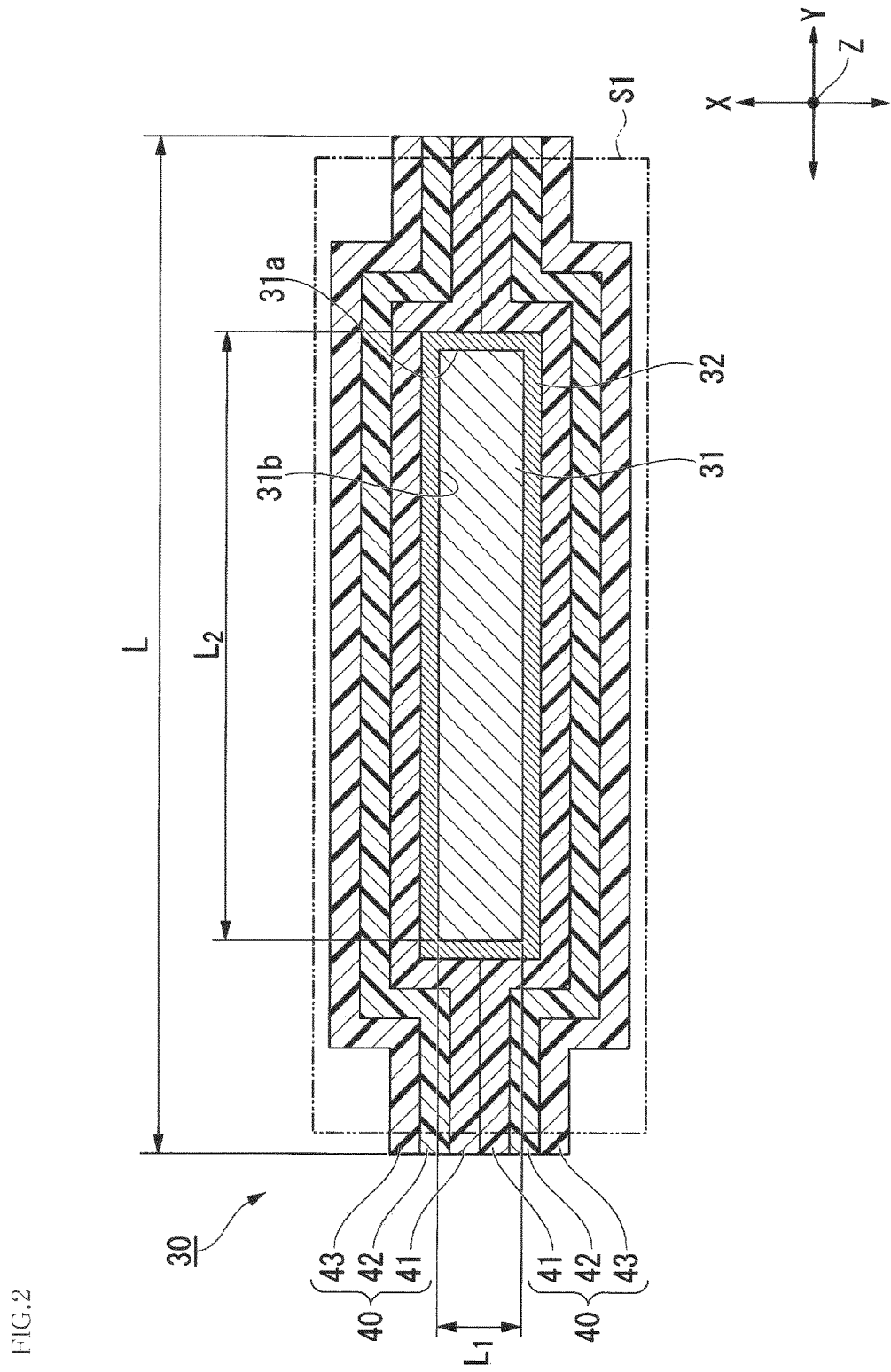
FIG. 2 is a cross-sectional view illustrating a tab of a secondary battery, according to an embodiment of the present invention.

First, the tabs 30 will be described. As shown in FIGS. 1 and 2, each tab 30 has a lead (metal terminal) 31 and a tab sealant (resin film) 40 provided on the outer peripheral surface of the lead 31.

(Lead 31)

The lead 31 serves as a terminal that extracts electricity from inside the secondary battery 1, that is, from the battery element 20. The lead 31 is formed into a plate shape (axial shape) extending in a predetermined direction. As shown in FIG. 2, a cross section of the lead 31 taken parallel to a reference plane S1 perpendicular to the longitudinal direction of the lead 31 is formed into a rectangular shape.

To prevent leakage of the contents of the secondary battery 1, a peripheral edge portion of the lead 31 is required to be in intimate contact with the tab sealant 40.

The quality of material of the leads 31 is preferably in conformity with respective collectors, not shown, provided inside the battery element 20 to be connected. For example, when the secondary battery 1 is a lithium ion battery, aluminum is used for the collector of the positive electrode. Therefore, it is preferable that aluminum is also used for the lead 31 connected to the positive electrode. Copper is used for the collector of the negative electrode. Therefore, it is preferable that copper is used for the lead 31 connected to the negative electrode.

From the viewpoint of corrosion, nickel plating is preferably applied to the surface of the lead 31. For the lead 31 connected to the positive electrode, aluminum having an aluminum purity of 97% or more, such as 1N30, is preferable in terms of corrosion resistance to an electrolytic solution. Since a heat-sealed portion between the tab 30 and the packaging material 10 is bent in some cases, a material that is tempered by annealing is more preferably used for the purpose of imparting flexibility.

The thickness of the lead 31 (length in a sandwiching direction X, described hereafter), although it depends on the size and capacity of the battery, is 50 μm (micrometers) or more for use in compact batteries, and in the range of 100 μm to 500 μm inclusive, for use in power storage batteries, in-vehicle batteries, or the like. The lead 31 used may be thicker for the purpose of reducing electrical resistance. The thickness of the tab sealant 40 is preferably selected as appropriate based on the thickness of the lead 31.

(Anti-Corrosion Treatment Layer 32)

An anti-corrosion treatment layer 32 prevents corrosion of the leads 31 due to corrosive components used in the secondary battery 1. The anti-corrosion treatment layer 32 is shown only in FIGS. 2 and 5 for the sake of convenience of description.

For example, when the secondary battery is a lithium ion battery, the leads 31 are corroded by a lithium salt, such as lithium hexafluorophosphate or lithium tetrafluoroborate, and hydrofluoric acid is produced by reaction of such a lithium salt with water, and the corrosion is required to be prevented.

The anti-corrosion treatment layer 32 is preferably a coated film formed of an acid-resistant anti-corrosion treatment agent of coating-type or immersion-type. When the anti-corrosion treatment layer 32 is such a coated film, anti-corrosion effect of the leads 31 to acid is improved. For example, the coated film can be formed by ceria sol treatment using an anti-corrosion treatment agent that contains cerium oxide, phosphate, and various thermosetting resins, or chromate treatment using an anti-corrosion treatment agent that contains chromate, phosphate, fluoride, and various thermosetting resins. As long as the anti-corrosion treatment layer 32 is a coated film with which corrosion resistance of the lead 31 can be sufficiently achieved, the anti-corrosion treatment layer 32 is not limited to the coated film formed by the foregoing treatments. For example, the coated film may be formed by phosphate treatment or boehmite treatment.

The lead 31 and the tab sealant 40 are bonded via the anti-corrosion treatment layer 32 provided over the entire outer periphery of the lead 31.

An overview of the configurations of the tab sealant 40 and the packaging material 10 will be described herein, followed by details of each configuration.

As shown in FIG. 2, the tab sealant 40 is preferably a laminate configured by laminating a plurality of layered bodies 41, 42, and 43. Hereafter, of the plurality of layered bodies 41, 42, and 43, the layer nearest to the lead 31 is referred to as an innermost layer 41, the layer farthest from the lead 31 is referred to as an outermost layer 43, and the layer laminated between the innermost layer 41 and the outermost layer 43 is referred to as an intermediate layer 42. The intermediate layer 42 does not necessarily have to be provided to the tab sealant 40.

As shown in FIG. 1, the packaging material 10 has a first packaging material 10A and a second packaging material 10B sandwiching the battery element 20. The tab sealant 40 is sandwiched between a first edge portion 10a of the first packaging material 10A and a second edge portion 10b of the second outer packaging material 10B.

A direction perpendicular to an end face 10f of the first edge portion 10a is defined to be a perpendicular direction Z. In this example, the perpendicular direction Z is parallel to the longitudinal direction of the lead 31.

Figure 3:
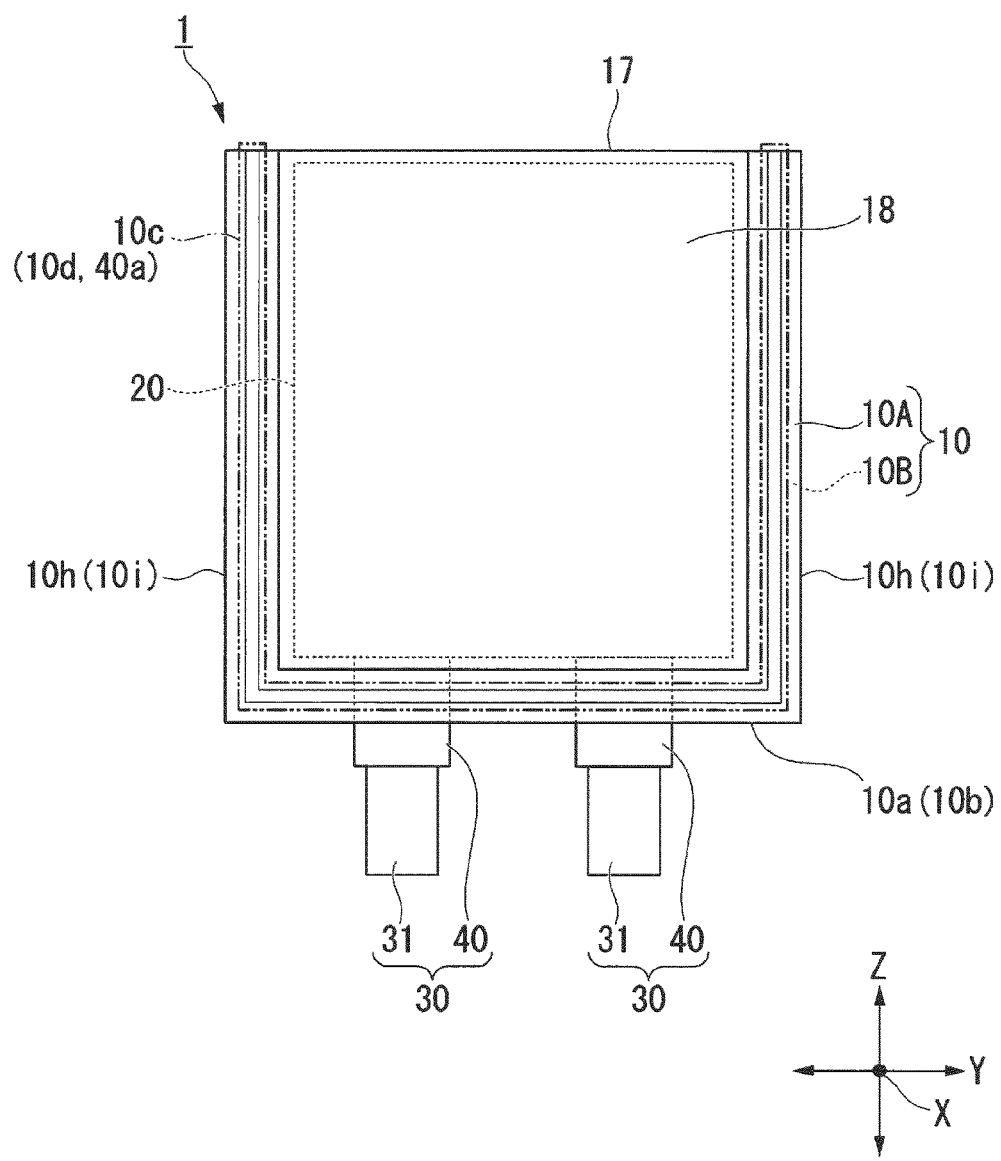
FIG. 3 is a plan view illustrating a packaging material of a secondary battery before edge portions of the packaging material are bent, according to an embodiment illustrating the present invention.

Other than the edge portions 10a and 10b, the packaging materials 10A and 10B have a third edge portion 10h of the first packaging material 10A and a fourth edge portion 10i of the second packaging material 10B. Before the third and fourth edge portions 10h and 10i are bent, the first and second edge portions 10a and 10b of the first and second packaging materials 10A and 10B, respectively, shown in FIG. 3, are formed into the same rectangular shape so as to overlap each other, when viewed from the sandwiching direction X of sandwiching the tab sealant 40 (in plan view).

The first and second packaging materials 10A and 10B each have four edge portions forming a rectangle. Of these edge portions, ones from the respective packaging materials are connected to each other by a connecting portion 17 to integrate the first and second packaging materials 10A and 10B. As a result of folding back the packaging material 10 along the connecting portion 17, the packaging materials 10A and 10B sandwich the battery element 20. Since the configurations of the first and second packaging materials 10A and 10B are the same, the following description addresses the first packaging material 10A.

Figure 4:
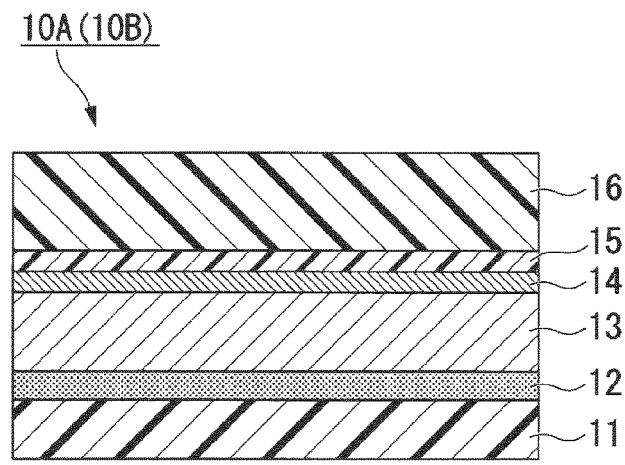
FIG. 4 is a cross-sectional view illustrating a first packaging material of a secondary battery, according to an embodiment of the present invention.

As shown in FIG. 4, the first packaging material 10A preferably has a laminated structure in which a base material layer 11, a base material adhesive layer 12, a metal foil layer 13, a packaging material anti-corrosion treatment layer 14, an adhesive resin layer 15, and a heat-sealable resin layer 16 are laminated in this order. In the first packaging material 10A, what is required is that at least the metal foil layer 13 and the heat-sealable resin layer 16 are laminated to each other. In the first packaging material 10A, the base material layer 11, the base material adhesive layer 12, the packaging material anti-corrosion treatment layer 14, and the adhesive resin layer 15 may be omitted from lamination.

Figure 5:
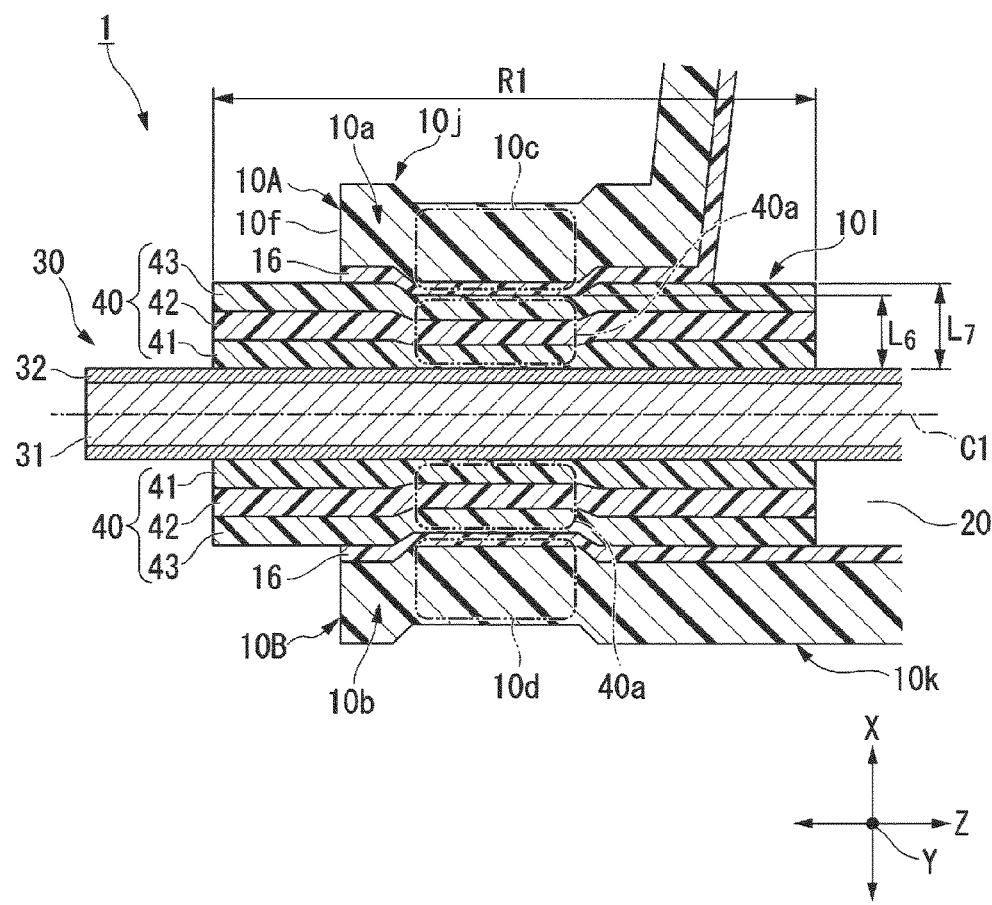
FIG. 5 is a cross-sectional view illustrating a main part of a secondary battery, according to an embodiment of the present invention.

FIG. 5 is a cross-sectional view of a main part of the secondary battery 1, taken parallel to a plane which includes a center axial line C1 of the lead 31 and is parallel to the sandwiching direction X. In FIG. 5, only the heat-sealable resin layers 16 of the packaging material 10A or 10B is shown for the sake of convenience of description.

As shown in FIGS. 3 and 5, in first and second packaging materials 10A and 10B, the tab sealant 40 of the tab 30 is sandwiched between the first edge portion 10a of the first packaging material 10A and the second edge portion 10b of the second packaging material 10B, which are in face-to-face relation with the connecting portion 17. The first and second packaging materials 10A and 10B are heat sealed while being pressed from outside in a state of being clamped by a known tool, along three edge portions of the packaging materials 10A and 10B, excepting the connecting portion 17. As a result, a first package sealed portion 10c is formed in the first packaging material 10A, a second package sealed portion 10d is formed in the second packaging material 10B, and a film sealed portion 40a is formed in the tab sealant 40.

The states, or, specifically, thickness and the like, of the sealed portions 10c, 10d, and 40a can be controlled by conditions such as temperature and pressure at the time of pressing and heat sealing, and duration of pressing and heat sealing, and the like.

The first package sealed portion 10c of the first packaging material 10A is reduced in thickness compared to a portion 10j (first peripheral region) other than the first package sealed portion 10c of the first exterior member 10A. The second package sealed portion 10d of the second packaging material 10B is reduced in thickness compared to a portion 10k (second peripheral region) other than the second package sealed portion 10d of the second exterior member 10B. The film sealed portion 40a of the tab sealant 40 is reduced in thickness compared to a portion 10l (third peripheral region) other than the film sealed portion 40a of the tab sealant 40.

When viewed from the sandwiching direction X as shown in FIG. 3, the first package sealed portion 10c, the second package sealed portion 10d, and the film sealed portion 40a have the same shape and overlap one other.

In the cross section shown in FIG. 5, the length of the first package sealed portion 10c, the length of the second package sealed portion 10d, and the length of the film sealed portion 40a in the perpendicular direction Z are equal to each other.

(Innermost Layer 41)

The innermost layer 41 imparts adhesiveness between the lead 31 on which the anti-corrosion treatment layer 32 is formed and the tab sealant 40. The innermost layer 41 is required to have adhesiveness with the lead 31 and the resins forming the tab sealant 40.

Components forming the innermost layer 41 include a polyolefin resin and an acid-modified polyolefin resin obtained by acid-modifying a polyolefin resin. Among these resins, an acid-modified polyolefin resin is preferable because adhesiveness with the lead 31 is improved. That is, the innermost layer 41 preferably contains an acid-modified polyolefin resin.

The polyolefin resin includes, for example, a low-, medium- or high-density polyethylene; an ethylene-α olefin copolymer, a homo polypropylene, a block polypropylene, a random polypropylene, a propylene-α olefin copolymer, or an acid-modified product of these materials. The acid-modified polyolefin includes, for example, a polyolefin obtained by acid-modifying a polyolefin with unsaturated carbonate, an anhydride thereof, or a derivative thereof.

The unsaturated carbonate, or an anhydride or a derivative thereof includes, for example, acrylate, methacrylate, maleic acid, fumaric acid, crotonic acid, itaconic acid, or an anhydride of these materials, a mono- or di-ester, an amide, an imide, or the like. Among them, acrylate, methacrylate, maleic acid, and maleic anhydride are preferable, and maleic anhydride is particularly preferable.

The unsaturated carbonate, or an anhydride or a derivative thereof only needs to be copolymerized with a polyolefin. The form of polymerization includes block copolymerization, random copolymerization, and graft copolymerization. The unsaturated carbonates, and anhydrides or derivatives thereof may be used singly or in combination of two or more.

The thickness of the innermost layer 41 is preferably in the range of 10 μm to 300 μm inclusive, and more preferably, in the range of 20 μm to 250 μm inclusive. If the thickness of the innermost layer 41 is less than 10 μm, filling of the resin into the lead 31 end portion during heat sealing with the lead 31 becomes insufficient. If the thickness of the innermost layer 41 exceeds 300 μm, a larger amount of heat becomes necessary during heat sealing, possibly causing deterioration of the moisture barrier properties.

From the viewpoint of filling resin in the lead 31 end portion, the thickness of the innermost layer 41 is preferably set in conformity with the thickness of the lead 31.

(Outermost Layer 43)

The outermost layer 43 serves to bond the tab sealant 40 with the heat-sealable resin layers 16 of the packaging materials 10A and 10B. As components forming the outermost layer 43, a polyolefin resin and an acid-modified polyolefin resin obtained by acid-modifying a polyolefin resin can be mentioned from the viewpoint of adhesion with the heat-sealable resin layers 16, but from the viewpoint of moisture barrier properties, a polyolefin resin is preferable.

The polyolefin resin and the acid-modified polyolefin resin include those which have been mentioned for the innermost layer 41. By selecting the component of the outermost layer 43 in conformity with the resins forming the adjacent layer in the tab sealant 40 (the innermost layer 41 or the intermediate layer 42) and the heat-sealable resin layer 16, adhesion to these layers is improved.

The thickness of the outermost layer 43 is preferably in the range of 10 μm to 300 μm inclusive, and more preferably in the range of 20 μm to 250 μm inclusive. If the outermost layer 43 is less than 10 μm thick, filling of the resin into the lead 31 end portion during heat sealing with the lead 31 becomes insufficient. If the thickness of the outermost layer 43 exceeds 300 μm, a larger amount of heat becomes necessary during heat sealing, leading to cost increase.

The melting point of the outermost layer 43 is preferably higher than that of the innermost layer 41. More preferably, the difference between the melting point of the outermost layer 43 and that of the innermost layer 41 is 5° C. or more.

When the melting point of the outermost layer 43 is higher than that of the innermost layer 41, the outermost layer 43 is prevented from melting and fluidizing when the innermost layer 41 is heat sealed to the lead 31, and thus the shape of the outermost layer 43 is more easily retained.

The specific heat of fusion of the outermost layer 43 measured according to JIS K 7122 is preferably in the range of 25 mJ/mg to 90 mJ/mg inclusive, and more preferably in the range of 35 mJ/mg to 85 mJ/mg inclusive.

If the specific heat of fusion of the outermost layer 43 is less than 25 mJ/mg, the resin of the outermost layer 43 more easily melts during heat sealing with the lead 31 or the packaging material 10. In this case, the resin fluidizes too much to ensure the thickness of the outermost layer 43. In addition, crystallization is lowered, and permeation of moisture unavoidably increases. If the specific heat of fusion exceeds 90 mJ/mg, the resin of the outermost layer 43 does not melt when heat sealed with the packaging material 10, and sufficient adhesion is not achieved.

In addition, the specific heat of fusion of the outermost layer 43 is preferably greater than that of the innermost layer 41.

In this case, the outermost layer 43 does not excessively fluidize during heat sealing with the lead 31, and the shape is more easily retained.

In the innermost and outermost layers 41 and 43, the specific heat of fusion (heat of melting) of portions other than the film sealed portion 40a measured according to JIS K 7122 is preferably in the range of 25 mJ/mg to 90 mJ/mg inclusive, and more preferably in the range of 35 mJ/mg to 85 mJ/mg inclusive.

If the specific heat of fusion is less than 25 mJ/mg, the resin more easily melts and excessively fluidizes during heat sealing with the lead 31 and the packaging material 10, and accordingly the thickness of the innermost layer 41 or the outermost layer 43 is not retained. In addition, crystallization is lowered, and moisture permeation unavoidably increases. If the specific heat of fusion exceeds 90 mJ/mg, the resin does not melt during heat sealing with the lead 31, and accordingly sufficient adhesion as well as sufficient filling of the lead 31 end portion may not or cannot be achieved.

(Intermediate Layer 42)

The tab sealant 40 may include an intermediate layer 42 formed of a layered body of one, or two or more layers, between the innermost layer 41 and the outermost layer 43. As the component forming the intermediate layer 42, a polyolefin resin and an acid-modified polyolefin resin obtained by acid-modifying a polyolefin resin can be mentioned, from the viewpoint of improving adhesion between the innermost layer 41 and the outermost layer 43.

In addition, the tab sealant 40 may include a layer such as a polyester film via an adhesive, for the purpose of trying to improve film thickness of the tab sealant 40 during heat sealing. The polyolefin resin and the acid-modified polyolefin resin include those which have been mentioned for the innermost layer 41.

The thickness of the overall intermediate layer 42 is preferably in the range of 10 μm to 200 μm inclusive, and more preferably in the range of 20 μm to 120 μm inclusive.

If the thickness of the overall intermediate layer 42 is less than 10 μm, insulation properties may not or cannot be ensured. A thickness exceeding 200 μm leads to cost increase.

The specific heat of fusion of at least one layer among the plurality of layers in the intermediate layer 42 measured according to JIS K 7122 is preferably 55 mJ/mg or more, and more preferably 60 mJ/mg or more. If the specific heat of fusion of all of the plurality of layers of the intermediate layer 42 is less than 55 mJ/mg, the resin more easily melts and excessively fluidizes during heat sealing with the lead 31 and the packaging material 10 not to ensure the film thickness. On the other hand, the upper limit of the specific heat of fusion of the intermediate layer 42 is not particularly limited, and only has to be in a range of not adversely affecting adhesion during pressing and heat sealing.

The specific heat of fusion of at least one of the plurality of layers of the intermediate layer 42 is preferably larger (higher) than that of the innermost layer 41 or the outermost layer 43. If the specific heat of fusion of any one of the plurality of layers of the intermediate layer 42 meets the conditions mentioned above, the thickness of the tab sealant 40 is more easily ensured.

It is preferable that, among the plurality of layered bodies, the layered bodies, or specifically the intermediate and outermost layers 42 and 43, other than the innermost layer 41 do not contain an acid-modified polyolefin resin.

During fabrication of the secondary battery 1, the tab sealant 40 configured in this way is arranged between each lead 31 and the packaging material 10A and between the lead 31 and the packaging material 10B, when the lead 31 is sandwiched between the package sealed portions 10c and 10d of the packaging materials 10A and 10B, respectively. The tab sealant 40 is provided over the entire outer peripheral surface of the lead 31.

The tab sealant 40 is made of a crystalline polymer, such as a polyolefin resin. Accordingly, the structure of the tab sealant 40 includes a crystalline portion that is in a crystallized state and an amorphous portion that is not in a crystallized state. The specific heat of fusion is dependent on the proportion of the crystalline portion (the proportion of the crystalline portion in the tab sealant structure containing the crystalline portion and the amorphous portion). The specific heat of fusion increases as the crystalline portion increases.

The tab sealant 40 may contain a high-melting point substance with a melting point of not less than the pressing/heat sealing temperature, a moisture absorbing agent for decreasing the moisture infiltrating from the package sealed portions 10c and 10d, and the like to ensure insulation properties, to an extent of not deteriorating adhesion, insulation properties and moisture barrier properties between the tab sealant 40 and the lead 31.

The specific heat of fusion of a portion other than the film sealed portion 40a in at least one layer of the plurality of layered bodies configuring the tab sealant 40 measured according to JIS K 7122 is preferably 55 mJ/mg or more, and more preferably 60 mJ/mg or more.

If the specific heat of fusion is less than 55 mJ/mg, the moisture barrier properties are lowered. In addition, the film thickness may not be maintained and the insulation properties may not be ensured. On the other hand, the upper limit of the specific heat of fusion is not particularly limited, and only has to be in a range of not adversely affecting adhesion during pressing/heat sealing.

As shown in FIG. 5, the sealed portions 10c, 10d, and 40a are formed in a range R1 where the tab sealant 40 is arranged, in a direction along the center axial line C1 that is the perpendicular direction Z of the lead 31.

When the conditions mentioned above are not met, the function of the tab sealant 40 as an insulating layer is not obtained, and thus the lead 31 and the metal foil layer 13 come into contact with each other, causing a short circuit. In addition, the moisture barrier properties of the interior of the secondary battery 1 can be deteriorated.

(Base Material Layer 11)

The base material layer 11 has a role of imparting heat resistance during a sealing step when the secondary battery 1 is fabricated, and minimizing formation of pin holes that may occur during processing or distribution. In addition, the base material layer 11 has a role of preventing breaking of the metal foil layer 13 during embossing, imparting insulation properties to prevent contact between the metal foil layer 13 and other metals, and the like.

The base material layer 11 includes, for example, a stretched or an unstretched film made of a polyester resin, a polyamide resin, a polyolefin resin, or the like. Among them, a biaxially stretched polyamide, a biaxially stretched polyester, and the like are preferable from the viewpoint of improving formability, heat resistance, anti-piercing properties, and insulation properties.

The base material layer 11 may be a single film, or a laminated film.

The thickness of the base material layer 11 is preferably in the range of 6 μm to 50 μm inclusive, from the viewpoint of anti-piercing properties, insulation properties, and emboss-processability, and more preferably in the range of 10 μm to 40 μm inclusive. When the thickness of the base material layer 11 is 6 μm or more, pin-hole resistance and insulation properties can be improved, and when the base material 11 is 50 μm or less, formability can be improved.

(Base Material Adhesive Layer 12).

As shown in FIG. 4, the base material adhesive layer 12 is formed between the base material layer 11 and the metal foil layer 13. The base material adhesive layer 12 has an adhesive strength required for firmly bonding the base material layer 11 and the metal foil layer 13.

In addition, the base material adhesive layer 12 has conformability for protecting the metal foil layer 13 from being broken by the base material layer 11 during embossing. Materials used as the base material adhesive layer 12 include a two-liquid curable adhesive containing a main resin, such as polyester polyol, polyether polyol, acrylic polyol, or the like, and a curing agent of an aromatic or aliphatic isocyanate.

The thickness of the base material adhesive layer 12 is preferably in the range of 0.5 μm to 10 μm inclusive, and more preferably in the range of 1 μm to 5 μm, from the viewpoint of adhesive strength, conformability, processability, and the like.

(Metal Foil Layer 13)

The metal foil layer 13 is formed between the base material adhesive layer 12 and the adhesive resin layer 15. The metal foil layer 13 has moisture barrier properties for preventing infiltration of moisture into the battery. In addition, the metal foil layer 13 has extensibility to enable deep drawing. As the metal foil layer 13, various metal foils such as of aluminum and stainless steel can be used. From the viewpoint of weight (specific gravity), moisture-proofing, processability, and cost, aluminum foil is preferable.

A known soft aluminum foil can be used as the aluminum foil serving as the metal foil layer 13, but from the viewpoint of pin-hole resistance and extensibility during forming, an aluminum foil containing iron is preferable. The iron content in the aluminum foil (100 mass %) is preferably in the range of 0.1 mass % to 9.0 mass % inclusive, and more preferably in the range of 0.5 mass % to 2.0 mass % inclusive, relative to the total mass 100 mass % of the aluminum foil. When the iron content is not less than the lower limit (0.1 mass %), the pin-hole resistance and extensibility are improved. When the iron content is not more than the upper limit (9.0 mass %), flexibility is improved.

The thickness of the metal foil layer 13 is preferably in the range of 10 μm to 100 μm inclusive, and more preferably in the range of 15 μm to 80 μm inclusive.

(Packaging Material Anti-Corrosion Treatment Layer 14)

The packaging material anti-corrosion treatment layer 14 is formed on a surface of the metal foil layer 13 near the heat-sealable resin layer 16. In the case of a lithium ion battery, for example, the packaging material anti-corrosion treatment layer 14 prevents corrosion of the metal foil layer 13 surface caused by hydrofluoric acid produced by reaction of the electrolyte with moisture.

In addition, the packaging material anti-corrosion treatment layer 14 functions as an anchor layer for the adhesive resin layer 15 and the base material adhesive layer 12, in addition to the anti-corrosion function. Treatments usable for the formation of the packaging material anti-corrosion treatment layer 14 include, for example, chromate treatment using an anti-corrosion treatment agent containing chromate, phosphate, fluoride, and various thermosetting resins, or ceria sol treatment using an anti-corrosion treatment agent containing an oxide of a rare-earth element (such as cerium oxide), phosphate, and various thermosetting resins.

As long as the packaging material anti-corrosion treatment layer 14 is a coated film that satisfies corrosion-resistance of the metal foil layer 13, the packaging material anti-corrosion treatment layer 14 is not limited to a coated film formed through the above-described processes. For example, phosphate treatment or boehmite treatment may be used. In addition, the packaging material anti-corrosion treatment layer 14 is not limited to a single layer, but may have a corrosion-resistant configuration of two layers or more obtained such as by coating a resin as an overcoat agent onto a corrosion-resistant coated layer.

The thickness of the packaging material anti-corrosion treatment layer 14 is preferably in the range of 5 nm (nanometers) to 1 μm inclusive, and more preferably in the range of 10 nm to 200 nm inclusive, from the viewpoint of the anti-corrosion function and the function as an anchor.

(Adhesive Resin Layer 15)

The adhesive resin layer 15 adheres the heat-sealable resin layer 16 with the metal foil layer 13 on which the packaging material anti-corrosion treatment layer 14 is formed. The adhesive resin layer 15 can have a thermal lamination configuration or a dry lamination configuration, depending on the preparation method.

In the case of the thermal lamination configuration in which the adhesive resin layer 15 is prepared by extrusion lamination, the component thereof is preferably a thermoplastic resin. As the component, for example, a polyolefin resin, an elastomer resin, and an acid-modified elastomer resin obtained by acid-modifying a polyolefin can be mentioned. Among them, an acid-modified polyolefin resin is preferable from the viewpoint of having good adhesiveness with the metal foil layer 13.

The acid-modified polyolefin resin includes those which have been mentioned for the innermost layer 41. Polyolefin resins and acid-modified polyolefin resins exhibit good resistance to electrolytic solution. The elastomer resin includes a copolymer, such as SEBS (polystyrene/polyethylene/polybutylene/polystyrene), SBS (polystyrene/polybutadiene/polystyrene), SEPS (polystyrene/polyethylene/polypropyl-ene/polystyrene), SEP (polystyrene/polyethylene/polypropylene), or SIS (polystyrene/polyisoprene/polystyrene).

Addition of these elastomer resins to the acid-modified polyolefin resin can improve characteristics, such as resistance to blushing due to cracks that may occur during stretching in cold forming and, heat-sealing strength, and prevent film formability from being lowered due to reduction in adhesive strength and anisotropy which is due to improvement in wettability.

When the adhesive resin layer 15 is prepared using the dry lamination configuration, an adhesive is used.

Specifically, adhesives applied to the adhesive resin layer 15 include an acid-modified polyolefin resin. The acid-modified polyolefin resin includes the polyolefin resins mentioned for the innermost layer 41.

In the case of the thermal lamination configuration, the thickness of the adhesive resin layer 15 is preferably in the range of 8 μm to 30 μm inclusive, and more preferably in the range of 10 μm to 20 μm inclusive. When the thickness of the adhesive resin layer 15 is 8 μm or more, sufficient adhesive strength can be easily achieved. When the thickness is 30 μm or less, the amount of moisture permeating into the battery interior from a seal end face can be more easily reduced.

When the adhesive resin layer 15 is prepared using the dry lamination configuration, the thickness of the adhesive resin layer 15 is preferably in the range of 1 μm to 5 μm inclusive. If the thickness is less than 1 μm, adhesive strength decreases and lamination strength may not or cannot be obtained. On the other hand, if the thickness exceeds 5 μm, the adhesive resin layer 15 becomes thick, and thus can be more easily cracked. Thus, when the thickness of the adhesive resin layer 15 is in the range of 1 μm to 5 μm inclusive, the heat-sealable resin layer 16 and the packaging material anti-corrosion treatment layer 14 can be firmly adhered.

(Heat-Sealable Resin Layer 16)

The heat-sealable resin layer 16 is formed on the packaging material anti-corrosion treatment layer 14 via the adhesive resin layer 15. With the heat-sealable resin layer 16 being laminated on the adhesive resin layer 15, and with the packaging materials 10A and 10B being arranged face-to-face, the heat-sealable resin layers 16 are pressed/heat sealed at a temperature of not less than the melting point of the heat-sealable resin layer 16, thereby achieving hermetic sealing.

As the heat-sealable resin layer 16, a polyolefin resin can be mentioned. The polyolefin resin includes, low-, medium- or high-density polyethylene, a homo, block or random polypropylene, or the like. In addition, the polyolefin resin includes a copolymer obtained by copolymerizing a polyolefin mentioned above with polar molecules such as of acrylic acid, or methacrylic acid, a polymer such as a cross-linked polyolefin. Thus, resins in the form of dispersion, copolymerization, or the like can be used.

These polyolefin resins may be used singly or in combination of two or more. The heat-sealable resin layer 16 may be formed of a film in which the above-mentioned various resins are mixed. The heat-sealable resin layer 16 may be a single-layer or multilayer film.

The heat-sealable resin layer 16 may contain various additives, such as a slipping agent, anti-blocking agent, anti-static agent, nucleating agent, pigment, and dye. These additives may be used singly or in combination of two or more.

The thickness of the heat-sealing resin layer 16 is preferably in the range of 20 μm to 90 μm inclusive. If the thickness of the heat-sealing resin layer 16 is less than 20 μm, sufficient lamination strength may not or cannot be ensured. If the thickness exceeds 90 μm, moisture permeation increases.

The packaging materials 10A and 10B sandwich the battery element 20, with the heat-sealable resin layer 16 being located inside. As shown in FIG. 2, the lead 31 is arranged so that the sandwiching direction X is parallel to a rectangle first side 31a.

As shown in FIG. 5, the first package sealed portion 10c is adhered with the film sealed portion 40a, and the second package sealed portion 10d is hermetically sealed with the film sealed portion 40a.

In the cross section taken parallel to the reference plane S1 shown in FIG. 2, when a length of the tab sealant 40 in a perpendicular direction Y that is perpendicular to the rectangle first side 31a is taken to be L, a length of the rectangle first side 31a is taken to be $L_1$, and a length of a second side 31b that is perpendicular to the rectangle first side 31a is $L_2$, Expression (2) is preferably satisfied.

$$L_1+2L_2 \leq L \leq 2L_1+2L_2 \qquad (2)$$

If the length L is less than the value of $(L_1+2L_2)$, the length of the tab sealant 40 is not sufficient relative to the lead 31. Therefore, a gap is formed between the tab sealant 40 and the lead 31 during pressing/heat sealing of the tab sealant 40 and the lead 31, and thus sufficient adhesion may not or cannot be achieved.

If the length L is greater than the value of $(2L_1+2L_2)$, the tab sealant 40 is excessively long. Therefore, thickness is increased in the end portions of the sealed portions 10c, 10d, and 40a, and accordingly, moisture more easily infiltrates inside and the moisture barrier properties can be deteriorated.

The specific heat of fusion of the film sealed portion 40a of the tab sealant 40 measured according to JIS K 7122 is preferably larger (higher) than those of the portions other than the film sealed portion 40a of the tab sealant 40, and more preferably, larger by 10 mJ/mg or more.

When the specific heat of fusion of the film side sealed portion 40a is large, the proportion of the crystalline portion mentioned above increases and moisture barrier properties are improved.

In the film sealed portion 40a, the specific heat of fusion of at least one layer of the plurality of layered bodies configuring the tab sealant 40 measured according to JIS K 7122 is preferably 65 mJ/mg or more, and more preferably 70 mJ/mg or more. The specific heat of fusion of the innermost layer 41 and the outermost layer 43 in the film sealed portion 40a is preferably in the range of 30 mJ/mg to 100 mJ/mg inclusive, and more preferably in the range of 35 mJ/mg to 85 mJ/mg inclusive.

If the specific heat of fusion of the film sealed portion 40a is less than 65 mJ/mg, the moisture barrier properties may not or cannot be sufficiently achieved. On the other hand, the upper limit of the specific heat of fusion is not particularly limited, and only has to be in a range of not adversely affecting adhesion during pressing/heat sealing. If the specific heat of fusion of the innermost layer 41 and the outermost layer 43 is less than 30 mJ/mg in the film sealed portion 40a, the resin more easily melts and fluidizes too much to ensure the film thickness. In addition, crystallization is lowered, and moisture permeation unavoidably increases. On the other hand, if the specific heat of fusion exceeds 100 mJ/mg, cracks can be more easily formed due to impact or bending.

Of the plurality of layered bodies of the tab sealant 40 in the film sealed portion 40a, the layered bodies having a specific heat of fusion of 40 mJ/mg or more measured according to JIS K 7122 preferably have a sum-total thickness in the range of 20% to 80% inclusive relative to the overall thickness of the tab sealant 40.

Let us take an example in which the tab sealant 40 is configured by two laminates in which a first layered body has a specific heat of fusion of 30 mJ/mg and a thickness of 70 μm, and a second layered body has a specific heat of fusion of 50 mJ/mg and a thickness of 30 μm. In this case, a layered body having a specific heat of fusion of 40 mJ/mg or more is the second layered body alone. Therefore, a sum-total thickness of the layered bodies having a specific heat of fusion of 40 mJ/mg or more is 30 μm that is the thickness of the second layered body. On the other hand, the entire thickness of the tab sealant 40 is 100 μm that is a sum-total thickness of the layered bodies. The proportion mentioned above (the proportion of a sum-total thickness of the layered bodies having a specific heat of fusion of 40 mJ/mg or more, relative to the entire thickness of the tab sealant 40) as obtained from Expression (3) is 30%.

$$30/100 \times 100 = 30(\%) \qquad (3)$$

If the proportion is less than 20%, this means that the proportion of the crystalline portion in the tab sealant 40 is low, and thus moisture barrier properties can be deteriorated. On the other hand, if the proportion exceeds 80%, this means that the proportion of the crystalline portion is high, and thus cracks can be more easily formed due to impact or bending.

As shown in FIG. 5, in the tab sealant 40, a thickness $L_6$ of the film sealed portion 40a relative to a thickness $L_7$ of portions other than the film sealed portion 40a is preferably in the range of 50% to 90% inclusive, and more preferably in the range of 60% to 85% inclusive.

If the thickness ratio is less than 50%, sufficient film thickness may not or cannot be ensured, and insulation properties may not or cannot be obtained. On the other hand, if the thickness ratio exceeds 90%, the end portion of the film sealed portion 40a becomes thick, and thus moisture barrier properties can be or are deteriorated.

The length of the film sealed portion 40a in the perpendicular direction Z of the lead 31 is preferably in the range of 3 mm to 20 mm inclusive, and more preferably in the range of 5 mm to 15 mm inclusive.

If the length is less than 3 mm, moisture infiltration amount increases. On the other hand, if the length exceeds 20 mm, the volume of the secondary battery 1 increases, and more space is required when installing the secondary battery.

As shown in FIG. 1, the third edge portion 10h among the plurality of edge portions of the first packaging material 10A other than the first edge portion 10a, and the fourth edge portion 10i among the plurality of edge portions of the second packaging material 10B other than the second edge portion 10b form a folded portion 19 that is bent towards a shaped portion 18 formed of the first packaging material 10A. The third edge portion 10h and the fourth edge portion 10i that are heat sealed together are integrally folded.

With the edge portions of the packaging materials 10A and 10B being bent, the widths of the package sealed portions 10c and 10d can be ensued, while the volumes thereof can be minimized, and moisture barrier properties can be obtained.

Although not shown, the battery element 20 is configured by a positive electrode, a separator, a negative electrode, a separator, and the like. The battery element 20 is housed in the shaped portion 18 of the first packaging material 10A and hermetically sealed, while the pair of tabs 30 connected to the positive electrode and the negative electrode of the battery element 20 are sandwiched between the packaging materials 10A and 10B.

[Method of Fabricating the Tab 30]

Next, a method of fabricating each tab 30 of the secondary battery 1 configured as described above will be described. It should be noted that the method of fabricating the tab 30 is not limited to the following method.

The method of fabricating the tab 30 includes, for example, the following steps (1-1) and (1-2).

(1-1) A step of forming the tab sealant 40.

(1-2) A step of heat sealing the tab sealant 40 to the lead 31.

Step (1-1)

The tab sealant 40 is prepared by extrusion. The forming method includes extrusion using a T-die, inflation using a ring die, or the like. Among them, inflation is preferable.

Extrusion temperature is preferably in the range of 180° C. to 300° C. inclusive. If the extrusion temperature is lower than 180° C., melting of the resin becomes insufficient, and extrusion from screws becomes unstable. If the extrusion temperature is higher than 300° C., the resin can be rapidly deteriorated due to oxidation or the like and the quality becomes poor. The number of rotations of the screws, blow ratio, and pulling speed are preferably selected as appropriate based on the set thickness of the tab sealant 40. In addition, the thickness ratio between the innermost layer 41, the outermost layer 43, and the intermediate layer 42 can be changed by the number of rotations of the screws.

Step (1-2)

Pressure is applied to the innermost layer 41 while it is melted by heating to adhere the tab sealant 40 to both surfaces of the lead 31. When performing pressing/heat sealing, it is required that only the innermost layer 41 is melted to ensure the thickness of the tab sealant 40, and the outermost layer 43 is not melted to retain the shape.

In addition, to achieve sufficient peel strength, the heating temperature is required to be not less than the melting point of the innermost layer 41. When the specific heat of fusion of the innermost layer 41 is less than that of the outermost layer 43, the heating temperature and heating time are set as appropriate, while retaining the shape of the outermost layer 43, and sufficient adhesion is obtained between the innermost layer 41 and the lead 31. The heating/pressing time is also required to be determined, considering peel strength and productivity. As the difference in melting temperature increases and as the difference in specific heat of fusion increases, heating temperature is increased to shorten heating time, and thus productivity is improved.

The tab 30 is fabricated by steps (1-1) and (1-2), described above.

[Method of Preparing the Packaging Material 10]

A method of fabricating the above-described packaging material 10 will be described.

The method of fabricating the packaging material 10 includes, for example, the following steps (2-1) to (2-3).

(2-1) A step of forming the packaging material anti-corrosion treatment layer 14 on one surface of the metal foil layer 13 by gravure coating.

(2-2) A step of preparing a laminate (packaging material anti-corrosion treatment layer 14/metal foil layer 13/base material adhesive layer 12/base material layer 11) by bonding the base material layer 11 onto a surface of the metal foil layer 13 via the base material adhesive layer 12 by dry lamination, the surface of the metal foil layer 13 being opposite the surface where the packaging material anti-corrosion treatment layer 14 is formed.

(2-3) A step of preparing the packaging material 10 (heat-sealable resin layer 16/adhesive resin layer 15/packaging material anti-corrosion treatment layer 14/metal foil layer 13/base material adhesive layer 12/base material layer 11) by bonding the heat-sealable resin layer 16 onto a surface of the metal foil layer 13 via the adhesive resin layer 15, the surface of the metal foil layer 13 being opposite to the surface where the base material layer 11 is formed.

Step (2-1)

An anti-corrosion treatment agent is coated onto one surface of the metal foil layer 13, followed by baking to thereby form the packaging material anti-corrosion treatment layer 14. In this case, anti-corrosion treatment can be performed on both surfaces, instead of only one surface of the metal foil layer 13. The method of coating the anti-corrosion treatment agent is not particularly limited. For example, the method includes gravure coating, reverse gravure coating, roll coating, reverse roll coating, die coating, bar coating, kiss coating, or comma coating.

Step (2-2)

A laminate (packaging material anti-corrosion treatment layer 14/metal foil layer 13/base material adhesive layer 12/base material layer 11) is prepared by bonding the base material layer 11 onto a surface of the metal foil layer 13 via the base material adhesive layer 12 by a dry lamination method, the surface of the metal foil layer 13 being opposite to the surface where the packaging material anti-corrosion treatment layer 14 is formed.

The method of coating the base material adhesive layer 12 is not particularly limited. For example, the method includes gravure coating, reverse gravure coating, roll coating, reverse roll coating, die coating, bar coating, kiss coating, or comma coating.

At step (2-2), to promote curing reaction and stabilize crystallization, an aging (curing) treatment is preferably performed in the range of 20° C. to 100° C. inclusive. At a temperature lower than 20° C., curing reaction is not promoted. If the temperature is higher than 100° C., the base material layer 11 can be deteriorated, and formability is lowered.

Step (2-3)

At the step (2-3) of fabricating the packaging material 10 using the laminate, whether to use a thermal lamination configuration or a dry lamination configuration greatly depends on the method of preparing the adhesive resin layer 15.

When using the thermal lamination configuration, a dry process or a wet process can further be used.

In the case of the dry process, the adhesive resin is extrusion-laminated directly onto the packaging material anti-corrosion treatment layer 14 of the laminate mentioned above, followed by laminating a film for forming the heat-sealable resin layer 16 obtained through inflation or T-die extrusion. Then, a heat treatment (e.g. aging treatment or thermal lamination) may be performed for the purpose of improving adhesion between the packaging material anti-corrosion treatment layer 14 and the adhesive resin layer 15. Alternatively, a multilayer film in which the adhesive resin layer 15 and the heat-sealable resin layer 16 are laminated may be prepared by inflation or casting, followed by laminating the multilayer film onto the laminate mentioned above by thermal lamination, thereby laminating the heat-sealable resin layer 16 via the adhesive resin layer 15.

In the case of the wet process, a dispersion-type adhesive resin solution of an adhesive resin, such as an acid-modified polyolefin resin, is coated onto the packaging material anti-corrosion treatment layer 14 of the laminate. Then, the solvent is volatilized at a temperature of not less than the melting point of the adhesive resin. Then, the adhesive resin is melted/softened and baked, followed by laminating the heat-sealable resin layer 16 by heat treatment, such as thermal lamination.

When using the dry lamination configuration, the adhesive resin layer 15 is coated onto the surface of the metal foil layer 13 of the laminate, where the packaging material anti-corrosion treatment layer 14 is formed, followed by drying the solution by use of an oven. Then, the heat-sealable resin layer 16 is thermocompression bonded by dry lamination, thereby preparing the packaging material 10.

The method of coating the adhesive resin layer 15 is not particularly limited. For example, the method includes gravure coating, reverse gravure coating, roll coating, reverse roll coating, die coating, bar coating, kiss coating, or comma coating.

At step (2-3), to promote curing reaction and stabilize crystallization, an aging (curing) treatment is preferably performed in the range of 20° C. to 100° C. inclusive. At a temperature lower than 20° C., curing reaction is not promoted. If the temperature is higher than 100° C., the base material layer 11 can be deteriorated, and formability is lowered.

The packaging material 10 is fabricated through steps (2-1) to (2-3) described above.

The method of fabricating the packaging material 10 is not limited to the method in which the steps (2-1) to (2-3) are successively performed. For example, step (2-1) may be performed after performing step (2-2).

[Method of Preparing the Secondary Battery 1]

Hereafter, a method of fabricating the secondary battery 1 will be described by way of an example of the embodiment. The method of fabricating the secondary battery 1 includes, for example, steps (3-1) to (3-4) described below.

Figure 6:
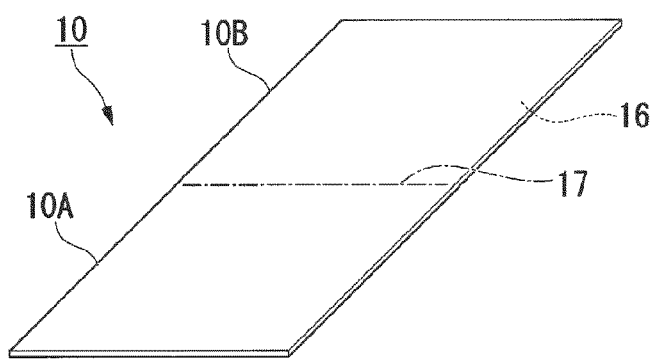
FIG. 6 is a perspective view illustrating a method for fabricating a secondary battery, according to an embodiment of the present invention.
Figure 7:
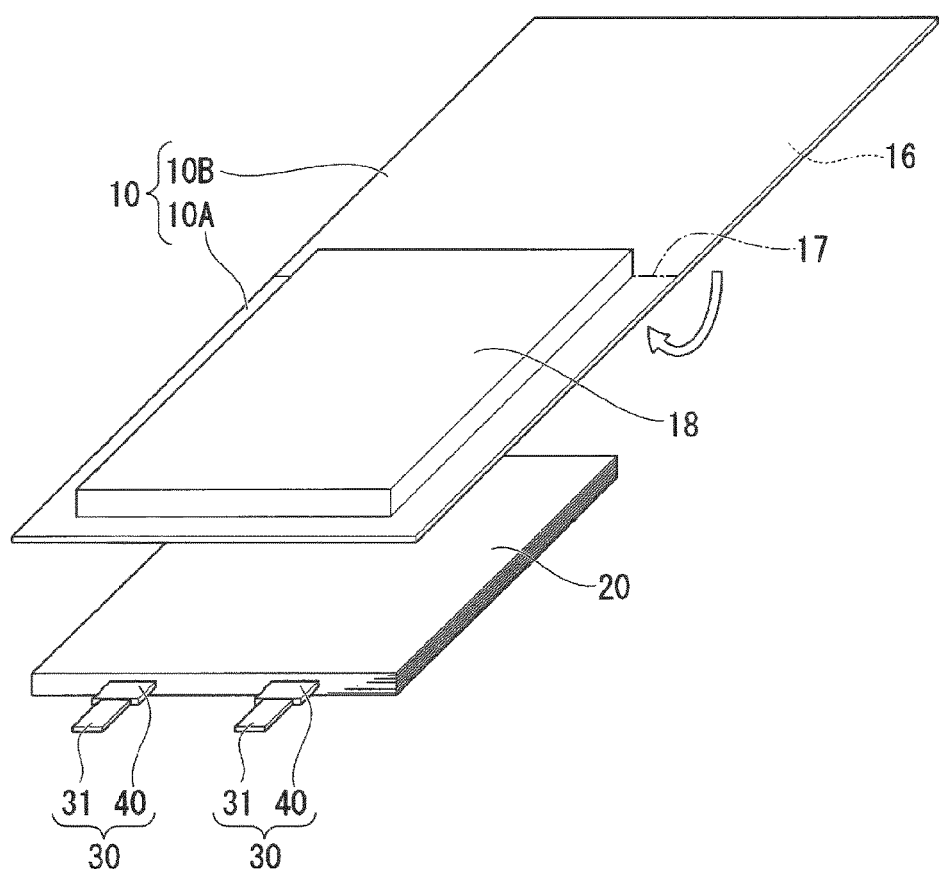
FIG. 7 is a perspective view illustrating a method for fabricating a secondary battery, according to an embodiment of the present invention.

(3-1) A step of forming the shaped portion 18 for arranging the battery element 20 in the packaging material 10 (see FIGS. 6 and 7).

(3-2) A step of arranging the battery element 20 in the shaped portion 18 of the packaging material 10, followed by overlapping the packaging material 10 thereon to press/heat seal the edge portion sandwiching the tab 30 (see FIGS. 7 and 3).

(3-3) A step of pressing/heat sealing a set of edge portions 10h and 10i, leaving the edge portions 10a and 10b sandwiching the tab 30 unsealed, followed by injecting an electrolytic solution from the remaining set of edge portions 10h and 10i, further followed by pressing/heat sealing the remaining set of edge portions 10h and 10i in a vacuum state (see FIG. 3).

(3-4) A step of cutting end portions of the pressed/heat sealed sides other than the edge portions 10a and 10b, followed by folding the sides towards the shaped portion 18 (see FIG. 1).

Step (3-1)

As shown in FIGS. 6 and 7, the shaped portion 18 is formed using a die so that the surface of the first packaging material 10A of the packaging material 10, the surface being formed with the heat-sealable rein layer 16, is shaped with a desired depth. As the forming method, a die having a negative part and a positive part with a gap of not less than the entire thickness of the packaging material 10 is used to deep-draw the first packaging material 10A from the heat-sealable resin layer 16 side towards the base material layer 11 side. As a result, the packaging material 10 having a desired amount of deep-draw is obtained.

Step (3-2)

As shown in FIGS. 3 and 7, the battery element 20 including the positive electrode, the separator, the negative electrode, the separator, and the like is placed in the shaped portion 18 of the packaging material 10. Then, the tabs 30 formed of the leads 31, which are connected to the positive and negative electrodes, and the tab sealants 40 are drawn out from the shaped portion 18.

After that, the first and second packaging materials 10A and 10B of the packaging material 10 are overlapped with each other such that their heat-sealable resin layers 16 are mated together, followed by pressing/heat sealing the edge portions 10a and 10b of the packaging material 10 sandwiching the tabs 30. The pressing/heat sealing can be controlled based on three conditions of temperature, pressure, and time, and is performed under the conditions of suitable pressure and melting temperature of not less than the heat-sealable resin 16 to reliably melt the edge portions.

At this time, the thickness of the first packaging material 10A is decreased to thereby form the first package sealed portion 10c in the first packaging material 10A. Similarly, the second package sealed portion 10d is formed in the second packaging material 10B, and the film sealed portion 40a is formed in the tab sealant 40.

Step (3-3)

Next, as shown in FIG. 3, pressing/heat sealing is similarly performed for a set of edge portions 10h and 10i, from among two sets of edge portions 10h and 10i overlapped with each other in plan view, other than the edge portions 10a and 10b sandwiching the tabs 30. Then, the electrolytic solution dissolved with the electrolyte is injected from the remaining set of edge portions 10h and 10i that have been left unsealed.

Following a de-gassing step in aging, a final pressing/heat sealing is performed for the remaining set of edge portions 10h and 10i in a vacuum state to prevent entry of air into the interior.

Step (3-4)

The end portions of the sealed portions 10c, 10d, and 40a of the edge portions 10h and 10i, other than the edge portions 10a and 10b sandwiching the tabs 30 are cut to remove the heat-sealable resin layers 16 that has run out of the edge portions. Then, as shown in FIG. 1, the edge portions 10h and 10i of the packaging materials 10A and 10B are folded (folded) towards the shaped portion 18 to form the folded portions 19, thereby fabricating the secondary battery 1.

The secondary battery 1 is fabricated through steps (3-1) to (3-4) described above.

However, the method of fabricating the secondary battery 1 is not limited to the above-described method. For example, step (3-4) can be omitted.

As described above, according to the secondary battery 1 of the present embodiment, the sealed portions 10c, 10d, and 40a are formed in the range R1 where the tab sealants 40 are arranged, in the perpendicular direction Z.

Thus, a gap is not formed between the packaging material 10A or 10B and each tab sealant 40, thereby preventing moisture infiltration into the secondary battery 1 to enhance moisture barrier properties. In addition, the metal foil layer 13 of the packaging material 10A or 10B is prevented from electrically contacting the leads 31, thereby retaining electrical insulation of the leads 31 from the packaging materials 10A and 10B.

By covering the outer peripheral surface of each lead 31 with the tab sealant 40, filling properties in the end portion of each lead 31 can be improved. By ensuring a contact area between the packaging material 10A or 10B and each tab sealant 40, adhesion of the packaging material 10A or 10B with the tab sealant 40 is ensured.

In addition, in the tab sealant 40, the specific heat of fusion of the film sealed portion 40a is greater than those of portions other than the film sealed portion 40a. Therefore, the proportion of the crystalline portion increases and the structure of the film sealed portion 40a becomes denser, and thus moisture infiltration into the secondary battery 1 can be prevented to thereby enhance moisture barrier properties.

An embodiment of the present invention has been specifically described with reference to the drawings. However, the specific configuration is not limited to the foregoing embodiment. The present invention encompasses modifications, combinations, omissions, and the like of the configuration within a scope not departing from the spirit of the present invention.

The foregoing embodiment has dealt with the case of the packaging material 10 which includes the first and second packaging materials 10A and 10B connected via the connecting portion, and is folded along the connecting portion. However, for example, the first and second packaging materials 10A and 10B do not have to be necessarily connected. The first and second packaging materials 10A and 10B each formed into a rectangular shape may be heat sealed along their four edge portions to configure a secondary battery.

The foregoing embodiment has dealt with the case where the packaging materials 10A and 10B are each formed into a rectangular shape when viewed from the sandwiching direction X. However, the shape of the packaging material 10A or 10B are not limited to this. The packaging materials 10A and 10B may each be formed into a polygonal shape, such as a hexagon or an octagon, or a circular shape, when viewed from the sandwiching direction X, overlapping each other.

EXAMPLES

Details of the present invention will be described by way of examples. However, the present invention should not be construed as being limited by the following description.

[Materials Used]

Materials used in the present examples are as follows.

(Tab Sealant 40)

Tab sealant A-1: Single-layer film (acid-modified polypropylene resin, thickness of 100 μm, specific heat of fusion of 58 mJ/mg).

Tab sealant A-2: Laminated film in which an innermost layer (acid-modified polypropylene resin, thickness of 50 μm, specific heat of fusion of 31 mJ/mg) and an outermost layer (polypropylene resin, thickness of 50 μm, specific heat of fusion of 58 mJ/mg) are laminated.

Tab sealant A-3: Laminated film in which an innermost layer (acid-modified polypropylene resin, thickness of 40 μm, specific heat of fusion of 31 mJ/mg), an intermediate layer (polypropylene resin, thickness of 20 μm, specific heat of fusion of 58 mJ/mg), and an outermost layer (polypropylene resin, thickness of 40 μm, specific heat of fusion of 40 mJ/mg) are laminated.

Tab sealant A-4: Single-layer film (acid-modified polypropylene resin, thickness of 100 μm, specific heat of fusion of 25 mJ/mg).

Tab sealant A-5: Laminated film in which an innermost layer (acid-modified polypropylene resin, thickness of 40 μm, specific heat of fusion of 25 mJ/mg), an intermediate layer (polypropylene resin, thickness of 20 μm, specific heat of fusion of 40 mJ/mg), and an outermost layer (acid-modified polypropylene resin, thickness of 40 μm, specific heat of fusion of 25 mJ/mg) are laminated.

Tab sealant A-6: Laminated film in which an innermost layer (acid-modified polypropylene resin, thickness of 40 μm, specific heat of fusion of 95 mJ/mg), an intermediate layer (polypropylene resin, thickness of 20 μm, specific heat of fusion of 97 mJ/mg), and an outermost layer (acid-modified polypropylene resin, thickness of 40 μm, specific heat of fusion of 95 mJ/mg) are laminated.

(Lead 31)

Lead B-1: Aluminum metal terminal (thickness of 100 μm, width of 12 mm, length of 50 mm).

(Anti-Corrosion Treatment Layer 32)

Treatment layer C-1: Treatment agent for coating-type ceria sol treatment mainly composed of cerium oxide, phosphate, and acrylic resin.

(Packaging Material 10)

Packaging material D-1: Laminate in which the base material layer 11 (polyamide film, 25 μm), the base material adhesive layer 12 (urethane resin-based adhesive), the metal foil layer 13 (aluminum foil, 40 μm), the packaging material anti-corrosion treatment layer 14 (treatment agent for coating-type ceria sol treatment), the adhesive resin layer 15 (maleic anhydride-modified polypropylene resin, 20 μm), and the heat-sealable resin layer 16 (polypropylene film, 40 μm) are laminated in this order.

Next, fabrication methods of examples and comparative examples will be described.

Example 1

The treatment layer C-1 was coated onto both surfaces of the lead B-1, followed by drying to form the anti-corrosion treatment layer.

Next, the tab sealant A-1 was cut into a 40 mm×30 mm size and the cut sealant A-1 was folded along its long side to sandwich the lead from its both surfaces so that the long side of the cut sealant A-1 coincides with the width direction of the lead, followed by pressing/heat sealing under the conditions of a sealing temperature of 150° C. and a sealing time of 10 seconds, thereby preparing a tab.

The packaging material D-1 was cut into an 80 mm×70 mm size and the cut material D-1 was folded back along its short side at the middle portion thereof into an 80 mm×35 mm size. On one of the short sides of the cut material D-1, the prepared tabs were sandwiched between the surfaces of the cut material D-1, followed by pressing/heat sealing under the conditions of a sealing temperature of 180° C., a sealing surface pressure of 0.5 MPa, a sealing time of 3 seconds and a sealing width of 10 mm, such that the thickness of 80 μm was achieved in the film sealed portion of the tab sealant.

Then, the long side of the cut material D-1 was pressed/heat sealed under the conditions of a sealing temperature of 180° C., a sealing surface pressure of 0.5 MPa, a sealing time of 3 seconds and a sealing width of 15 mm. Then, 3 mg of electrolytic solution in which ethylene carbonate (EC), dimethyl carbonate (DMC), and diethyl carbonate (DEC) were mixed at a weight ratio of 1:1:1, with the moisture content being reduced to 20 ppm or lower, was injected from the remaining short side of the cut material D-1. Then, the remaining one side was pressed/heat sealed under the conditions of a sealing temperature of 180° C., a sealing surface pressure of 0.5 MPa, a sealing time of 3 seconds and a sealing width of 15 mm, thereby preparing an evaluation sample. The specific heat of fusion of the film sealed portion of each tab sealant was 67 mJ/mg.

In this example, the specific heat of fusion of the film sealed portion of the tab sealant was 67 mJ/mg, and the specific heat of fusion of portions of the tab sealant other than the film sealed portion was 58 mJ/mg, remaining unchanged from the value described for tab sealant A-1.

Example 2

An evaluation sample was prepared in a manner similar to that of Example 1, except that the tab sealant A-2 was used as a tab sealant. The specific heat of fusion of the film sealed portion of each tab sealant was 34 mJ/mg for the innermost layer, and 65 mJ/mg for the outermost layer.

Example 3

An evaluation sample was prepared in a manner similar to that of Example 1, except that the tab sealant A-3 was used as a tab sealant. The specific heat of fusion of the film sealed portion of each tab sealant was 33 mJ/mg for the innermost layer, 64 mJ/mg for the intermediate layer, and 46 mJ/mg for the outermost layer.

Example 4

An evaluation sample was prepared in a manner similar to that of Example 1, except that the tab sealant A-3 was used as a tab sealant, and the tabs and the packaging material D-1 were pressed/heat sealed under the conditions of a sealing temperature of 170° C., a sealing surface pressure of 0.5 MPa, a sealing time of 3 seconds, and a sealing width of 10 mm. The specific heat of fusion of the film sealed portion of each tab sealant was 41 mJ/mg for the innermost layer, 67 mJ/mg for the intermediate layer, and 48 mJ/mg for the outermost layer.

Example 5

An evaluation sample was prepared in a manner similar to that of Example 1, except that the tab sealant A-3 was used as a tab sealant, and the tabs and the packaging material D-1 were pressed/heat sealed under the conditions of a sealing temperature of 180° C., a sealing surface pressure of 0.5 MPa, a sealing time of 3 seconds and a sealing width of 10 mm, such that the thickness of the film sealed portion of the tab sealant became 60 μm. The specific heat of fusion of the film sealed portion of the tab sealant was 34 mJ/mg for the innermost layer, 65 mJ/mg for the intermediate layer, and 47 mJ/mg for the outermost layer.

Comparative Example 1

An evaluation sample was prepared in a manner similar to that of Example 1, except that the tab sealant A-4 was used as a tab sealant, and the tabs and the packaging material D-1 were pressed/heat sealed under the conditions of a sealing temperature of 200° C., a sealing surface pressure of 0.5 MPa, a sealing time of 3 seconds, and a sealing width of 10 mm. The specific heat of fusion of the film sealed portion of the tab sealant was 24 mJ/mg.

Comparative Example 2

An evaluation sample was prepared in a manner similar to that of Example 1, except that the tab sealant A-5 was used as a tab sealant, and the tabs and the packaging material D-1 were pressed/heat sealed under the conditions of a sealing temperature of 200° C., a sealing surface pressure of 0.5 MPa, a sealing time of 3 seconds, and a sealing width of 10 mm. The specific heat of fusion of the film sealed portion of the tab sealant was 24 mJ/mg for the innermost layer, 40 mJ/mg for the intermediate layer, and 24 mJ/mg for the outermost layer.

Comparative Example 3

An evaluation sample was prepared in a manner similar to that of Example 1, except that the tab sealant A-6 was used as a tab sealant, and the tabs and the packaging material D-1 were pressed/heat sealed under the conditions of a sealing temperature of 200° C., a sealing surface pressure of 0.5 MPa, a sealing duration of 3 seconds, and a sealing width of 10 mm. The specific heat of fusion of the film sealed portion of the tab sealant was 93 mJ/mg for the innermost layer, 93 mJ/mg for the intermediate layer, and 90 mJ/mg for the outermost layer.

Comparative Example 4

The tab sealant A-1 was cut into a 40 mm×8 mm size and the cut sealant A-1 was folded along its long side to sandwich the lead from its both surfaces so that the long side of the cut sealant A-1 coincides with the width direction of the lead, followed by pressing/heat sealing, thereby preparing a tab. An evaluation sample was prepared in a manner similar to that of Example 1, except that the tabs and the packaging material D-1 were pressed/heat sealed under the conditions of a sealing temperature of 200° C., a sealing surface pressure of 0.5 MPa, a sealing time of 3 seconds, and a sealing width of 10 mm. The specific heat of fusion of the film sealed portion of the tab sealant was 68 mJ/mg.

[Evaluation Method for the Moisture Barrier Properties]

After the prepared evaluation samples were stored for 4 weeks in a 60° C. and 90% humidity environment, the moisture content of the electrolytic solution was measured for each sample using a Karl Fischer testing machine, and the values of the moisture content were relatively evaluated with reference to example 1 (100%).

The evaluations were made based on the following benchmarks.

"G (Good)": Less than 120% in comparison to the moisture content of Example 1.

"P (Poor)": 120% or more in comparison to the moisture content of Example 1.

[Evaluation Method for Insulation Properties Between the Lead and the Packaging Material]

Whether or not short-circuiting had occurred between the lead 31 and the metal foil layer 13 of the packaging material 10 in the evaluation battery sample prepared in each example was checked using a tester.

The evaluations were made based on the following benchmarks.

"G (Good)": Short-circuiting occurred in 0 samples per 100 samples.

"P (Poor)": Short-circuiting occurred in one or more samples per 100 samples.

[Evaluation Method for Lead End-Portion Filling Properties]

The tab prepared in each example was stained using a highly permeable stain solution (Micro Check manufactured by Taihokohzai Co., Ltd.) to evaluate filling properties.

The evaluations were made based on the following benchmarks.

"G (Good)": The lead end portion was stained by permeation of the highly permeable stain solution in zero samples per 50 samples.

"P (Poor)": The lead end portion was stained by permeation of the highly permeable stain solution in one or more samples per 50 samples.

[Evaluation Method for Adhesion Between the Tab Sealant and the Packaging Material]

The adhesion between each tab and the packaging material of the evaluation sample obtained in each example was evaluated by measuring the peel strength between the tab sealant and the lead using a tensile tester at a pulling speed of 100 mm/min with T peeling, for evaluation with reference to Example 1 (100%).

The evaluations were made based on the following benchmarks.

"G (Good)": Decrease in peel strength was less than 20% or peel strength improved, in comparison with the reference peel strength.

"P (Poor)": Peel strength decreased by 20% or more, in comparison with the reference peel strength.

Table 1 shows Evaluation results of the moisture barrier properties, insulation properties between the lead and the packaging material, filling properties of the lead end portion, and adhesiveness between the tab sealant and the packaging material.

TABLE 1

|  | Moisture barrier properties | Insulation properties | Filling properties | Adhesiveness |
| --- | --- | --- | --- | --- |
| Example 1 | G | G | G | G |
| Example 2 | G | G | G | G |
| Example 3 | G | G | G | G |
| Example 4 | G | G | G | G |
| Example 5 | G | G | G | G |
| Comp. Example 1 | P | P | G | G |
| Comp. Example 2 | P | P | G | G |
| Comp. Example 2 | P | G | P | P |
| Comp. Example 4 | P | P | P | P |

As a result of comparative review of moisture barrier properties, the moisture contents of Examples 2 to 5 were each less than 120% relative to Example 1, whereas the moisture contents of Comparative examples 1 to 4 were each 120% or more. The reason why the moisture contents increased in Comparative Examples 1 and 2 is considered to be that the specific heat of fusion of the heat-sealed portion of the tab sealant was small and the tab sealant was amorphous, and thus moisture easily permeated into the tab sealant.

The reason why moisture content increased in Comparative Example 3 is considered to be because filling properties for the lead end portion were insufficient. The reason why moisture content increased in Comparative Example 4 is considered to be because the length of the tab sealant in the moisture infiltration direction was short and moisture easily permeated into the tab sealant.

As a result of comparative review of insulation properties between the lead and the packaging material, insulation properties between the lead and the packaging material were achieved in Examples 1 to 5 and Comparative Example 3, whereas short-circuiting was confirmed between the lead and the metal foil layer of the packaging material in Comparative Examples 1, 2 and 4. The reason why short-circuiting occurred in Comparative Examples 1 and 2 is considered to be because the specific heat of fusion of the tab sealant was low, and the tab sealant was fluidized and flowed out during pressing/heat sealing, and thus film thickness could not be ensured. In Comparative Example 4, the tab sealant was small, and it is considered that the end portion of the metal foil layer was in contact with the lead.

As a result of comparative review of filling properties of the lead end portion, filling properties of the lead end portion were achieved in Examples 1 to 5, and Comparative Examples 1 and 2, whereas filling in the lead end portion was insufficient in Comparative Examples 3 and 4. The reason why the lead end portion was not filled in Comparative Example 3 is considered to be because the specific heat of fusion of the tab sealant was high and melting was insufficient during pressing/heat sealing. In Comparative Example 4, filling properties were poor which is considered to be because the length of the tab sealant was shorter than the width of the sealed portion.

As a result of comparative review of adhesiveness between the tab sealant and the packaging material, adhesion was achieved in Examples 1 to 5, and Comparative Examples 1 and 2, whereas adhesion was insufficient in Comparative Examples 3 and 4. The reason why adhesion was not achieved in Comparative Example 3 is considered to be because the specific heat of fusion of the tab sealant was high and melting was insufficient during pressing/heat sealing. The reason why adhesion was not achieved in Comparative Example 4 is considered to be because the length of the tab sealant was shorter than the width of the sealed portion, and thus the sealed area between the heat-sealable resin layer of the packaging material and the tab sealant was small.

REFERENCE SIGNS LIST 1 secondary battery
10a first edge portion
10b second edge portion
10A first packaging material
10B second packaging material
10c first package sealed portion
10d second package sealed portion
10f end face
10h third edge portion
20 battery element
31 lead (metal terminal)
31a first side
31b second side
40 tab sealant (resin film)
40a film sealed portion
41 innermost layer (layered body)
42 intermediate layer (layered body)
43 outermost layer (layered body)
R1 area
S1 reference plane
X sandwiching direction
Z perpendicular direction

What is claimed is:
1. A secondary battery comprising:
a battery element that includes a positive electrode and a negative electrode;
a plurality of metal terminals that are respectively connected to the positive electrode and the negative electrode, the metal terminals each having an outer peripheral surface provided with a resin film;
a first packaging material and a second packaging material each of which includes a lamination of at least a metal foil layer and a heat-sealable resin layer made of a polyolefin resin, the first packaging material and the second packaging material sandwiching the battery element therebetween so that the heat-sealable resin layer is located inside;
a first package sealed portion that is formed in the first packaging material between a first peripheral region and a first edge portion so as to be smaller in thickness than in the first peripheral region of the first packaging material, by sandwiching the resin film between the first edge portion of the first packaging material and a second edge portion of the second packaging material, and pressing and heat sealing the first packaging material and the second packaging material sandwiching the resin film therebetween, in a manner of clamping the first and second packaging materials from outside;
a second package sealed portion that is formed in the second packaging material between a second peripheral region and the second edge region so as to be smaller in thickness than in the second peripheral region of the second packaging material, by sandwiching the resin film between the first edge portion of the first packaging material and the second edge portion of the second packaging material, and pressing and heat sealing the first packaging material and the second packaging material sandwiching the resin film therebetween, in a manner of clamping the first and second packaging materials from outside; and
a film sealed portion that is formed in the resin film adjacent to a third peripheral portion so as to be smaller in thickness than in the third peripheral region of the resin film, by sandwiching the resin film between the first edge portion of the first packaging material and the second edge portion of the second packaging material, and pressing and heat sealing the first packaging material and the second packaging material sandwiching the resin film therebetween, in a manner of clamping the first and second packaging materials from outside, the film sealed portion being in intimate contact with the first packaging material and being in intimate contact with the second packaging material, wherein
positions at which the first package sealed portion, the second package sealed portion, and the film sealed portion are formed in a perpendicular direction to an end face of the first edge portion are within a range where the resin film is arranged in the perpendicular direction to the end face of the first end portion, and
a specific heat of fusion of the film sealed portion measured according to JIS K 7122 is greater than a specific heat of fusion of a portion of the resin film other than the film sealed portion, wherein the resin film is configured by laminating a plurality of layered bodies;

wherein at least one of the plurality of layered bodies has the film sealed portion where a specific heat of fusion measured according to JIS K 7122, is 65 mJ/mg or more; and wherein of the plurality of layered bodies, an innermost layer and an outermost layer have a specific heat of fusion, in the film sealed portion, in a range of 30 mJ/mg to 100 mJ/mg, inclusive, when a layer nearest to the metal terminal is the innermost layer and a layer farthest from the metal terminal is the outermost layer.

2. The secondary battery of claim 1, wherein the film sealed portion has a length in a range of 3 mm to 20 mm, inclusive, in the perpendicular direction.

3. The secondary battery according to claim 1,
wherein for at least one of the plurality of layered bodies, a specific heat of fusion of a portion other than the film sealed portion measured according to JIS K 7122 is 55 mJ/mg or more; and wherein for the innermost layer and the outermost layer, a specific heat of fusion of a portion other than the film sealed portion measured according to JIS K 7122 is in a range of 25 mJ/mg to 90 mJ/mg, inclusive.

4. The secondary battery of claim 1, wherein, in the film sealed portion of the plurality of layered bodies, a sum-total thickness of the layered bodies having a specific heat of fusion of 40 mJ/mg or more measured according to JIS K 7122 is in a range of 20% to 80%, inclusive, relative to an overall thickness of the resin film.

5. The secondary battery of claim 1, wherein in the resin film, the film sealed portion has a thickness in a range of 50% to 90%, inclusive, relative to a thickness of the film in the third peripheral region.

6. The secondary battery of claim 1,
wherein the metal terminal has a cross section in a rectangular shape, the cross section being taken parallel to a reference plane that is perpendicular to the perpendicular direction;

wherein the rectangular shape has a first side that is arranged parallel to a sandwiching direction in which the first edge portion of the first packaging material and the second edge portion of the second packaging material sandwich the resin film therebetween; and wherein, in the cross section taken parallel to the reference plane, when a length of the resin film in a perpendicular direction that is perpendicular to the first side is L, a length of the first side is $L_1$, and a length of a second side orthogonal to the first side is $L_2$, Expression (1) is satisfied:

$$L_1 + 2L_2 \leq L \leq 2L_1 + 2L_2 \qquad (1).$$

7. The secondary battery of claim 1,
wherein the innermost layer contains a polyolefin resin that has been acid-modified; and wherein the layered bodies in the plurality of layered bodies other than the innermost layer do not contain any polyolefin resin that has been acid-modified.

8. The secondary battery of claim 1,
wherein the first packaging material and the second packaging material are each formed into the same shape that is a polygon and overlap each other, when viewed from the sandwiching direction; and wherein the first packaging material has a plurality of edge portions in which third edge portions other than the first edge portion are bent.

* * * * *